United States Patent
Betts (10) Patent No.: US 7,072,387 B1
(45) Date of Patent: Jul. 4, 2006

(54) FRACTIONAL BIT RATE ENCODING IN A DISCRETE MULTI-TONE COMMUNICATION SYSTEM

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 972 days.

(21) Appl. No.: 09/717,436

(22) Filed: Nov. 20, 2000

Related U.S. Application Data (60) Provisional application No. 60/170,992, filed on Dec. 15, 1999.

(51) Int. Cl.
*H04B 5/02* (2006.01)

(52) U.S. Cl. .................................................. 375/219
(58) Field of Classification Search ................ 375/219, 375/222, 239, 261, 295, 296, 298, 135, 146, 375/140; 332/103, 107, 112, 123, 159, 113, 332/122
See application file for complete search history.

(56) References Cited

U.S. PATENT DOCUMENTS

| | | | | |
|---|---|---|---|---|
| 4,866,395 A | * | 9/1989 | Hostetter | 329/309 |
| 4,945,549 A | * | 7/1990 | Simon et al. | 375/53 |
| 5,251,236 A | * | 10/1993 | Brehmer et al. | 375/59 |
| 5,598,435 A | | 1/1997 | Williams | 375/261 |
| 6,088,387 A | * | 7/2000 | Gelblum et al. | 375/222 |
| 6,157,678 A | * | 12/2000 | Wei | 375/243 |
| 6,226,322 B1 | * | 5/2001 | Mukherjee | 375/229 |
| 6,272,108 B1 | * | 8/2001 | Chapman | 370/226 |
| 6,307,890 B1 | * | 10/2001 | Dyson et al. | 375/265 |
| 6,389,062 B1 | * | 5/2002 | Wu | 375/222 |
| 6,421,375 B1 | * | 7/2002 | Chu et al. | 375/222 |
| 6,512,789 B1 | * | 1/2003 | Mirfakhraei | 375/229 |
| 6,693,903 B1 | * | 2/2004 | Shively | 370/370 |
| 6,766,516 B1 | * | 7/2004 | Draganic | 718/102 |

\* cited by examiner

*Primary Examiner*—Kenneth Vanderpuye
*Assistant Examiner*—Dung X. Nguyen
(74) *Attorney, Agent, or Firm*—Thomas, Kayden, Horstemeyer & Risley (57) ABSTRACT

Fractional bit rate encoding in a discrete multi-tone (DMT) communication environment allows the transmission of fractional bit rates, thus maximizing the use of signal-to-noise ratio (SNR) available on each of the DMT carriers, or tones, while maintaining a constant power density over the entire frequency spectrum.

29 Claims, 5 Drawing Sheets

FRACTIONAL BIT RATE ENCODING IN A DISCRETE MULTI-TONE COMMUNICATION SYSTEM

CROSS-REFERENCE TO RELATED APPLICATIONS

This document claims priority to and the benefit of the filing date of Provisional Application Ser. No. 60/170,992 entitled DISCRETE MULTI-TONE FRACTIONAL BIT RATE, filed Dec. 15, 1999, which is hereby incorporated by reference.

TECHNICAL FIELD

The present invention relates generally to communications systems, and more particularly, to fractional bit rate encoding in a discrete multi-tone (DMT) communications system.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modern communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location, typically referred to as the customer premises (CP). DSL communication devices use different formats and different types of modulation schemes and achieve widely varying communication rates. However, even the slowest DSL communications devices achieve data rates far in excess of conventional point-to-point modems.

Some of the available modulation schemes include quadrature-amplitude modulation (QAM), carrierless amplitude/phase (CAP) and DMT. In a DMT modulation scheme, a number of carriers, commonly referred to as "tones" are encoded with the information to be transmitted and communicated over the communications channel. This information, in the form of data words, is encoded into signal space constellations and then transmitted. In a typical DMT transmitter, 256 carrier tones are used to encode the data and are added together resulting in a very high peak signal power due to the high numerical peak resulting from the addition of the 256 tones. Power consumption is further increased due to the use of square signal space constellations used in conventional DMT transmitters and the allowed +2.5 dB to −14.5 dB power variation allowed on each carrier tone. Square signal space constellations have an inherently high peak signal power due to the location of the highest power signal point. The peak signal power in conventional DMT transmitters is sufficiently high to cause saturation or clipping of the transmitter in normal operation. Conventional DMT allows a probability of clipping of $10^{-7}$. To combat this inherent deficiency, conventional DMT transmitters use expensive Reed-Solomon forward error correction encoders combined with bit wise interleavers. Coders such as these induce a significant amount of throughput delay and are unsuitable for multi-point communication environments.

The number of bits encoded on each DMT carrier is selected in whole bit increments to bring the margin associated with each tone to within 3 dB of the specified margin. Contributing to the peak power problem, the DMT modulation scheme allows the power on individual tones to be increased by up to 2.5 dB to satisfy margin requirements. While increasing the power on some tones, the system reduces the power on other tones to maintain the specified transmit power. This scheme of tone power variation is useful in instances where it may be desirable to turn off specified tones and allocate their power to other tones. Unfortunately, this tone power variation results in spectrum management difficulties. Conventional DMT systems simply turn off specified tone carriers and increase others by the allowed 2.5 dB, but this results in the undesirable situation in which some carriers will be 2.5 dB hotter than necessary in certain spectral bands, resulting in undesirable cross-talk, while other carrier tones are switched off completely. The tones at the high end of the frequency spectrum are frequently switched off.

Crosstalk between wire pairs in cable bundles or in dense equipment cabinets is the major contributor to degradation in DSL networks. Spectrum management schemes have been proposed to limit cross-talk by specifying a Power Spectrum Density (PSD) for all DSL transmitters. DMT allows PSD pass band ripple of +3.5 dB to accommodate the +2.5 dB power variation on individual tones. While currently allowed, a boost of 2.5 dB in power will effectively lower channel capacity by 2.5 dB on neighboring wire pairs, thereby nullifying any true gain that may have been anticipated. It is desirable to have a DMT system that can transmit a specified PSD with pass band ripple of less than 1 dB.

Thus, it would be desirable to have a DMT communication system capable of transmitting fractional bit rates, while maintaining desirable spectral power requirements.

SUMMARY

The invention is an improved system and method for communicating over a digital subscriber line. The invention allows the transmission of fractional bit rates in a DMT transceiver, thus maximizing the use of signal-to-noise ratio (SNR) available on each of the DMT carriers, or tones, while maintaining a constant power density over the entire frequency spectrum.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Although described with particular reference to an asymmetric digital subscriber line (ADSL) communication system, the fractional bit rate encoding for DMT can be implemented in any communication system using DMT transmission.

Furthermore, the fractional bit rate encoding for DMT can be implemented in software, hardware, or a combination thereof. In a preferred embodiment(s), selected portions of the fractional bit rate encoding for DMT are implemented in hardware and software. The hardware portion of the invention can be implemented using specialized hardware logic. The software portion can be stored in a memory and can be executed by a suitable instruction execution system (microprocessor). The hardware implementation of the fractional bit rate encoding for DMT can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc Furthermore, the fractional bit rate encoding for DMT software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figures 1A, 1B:
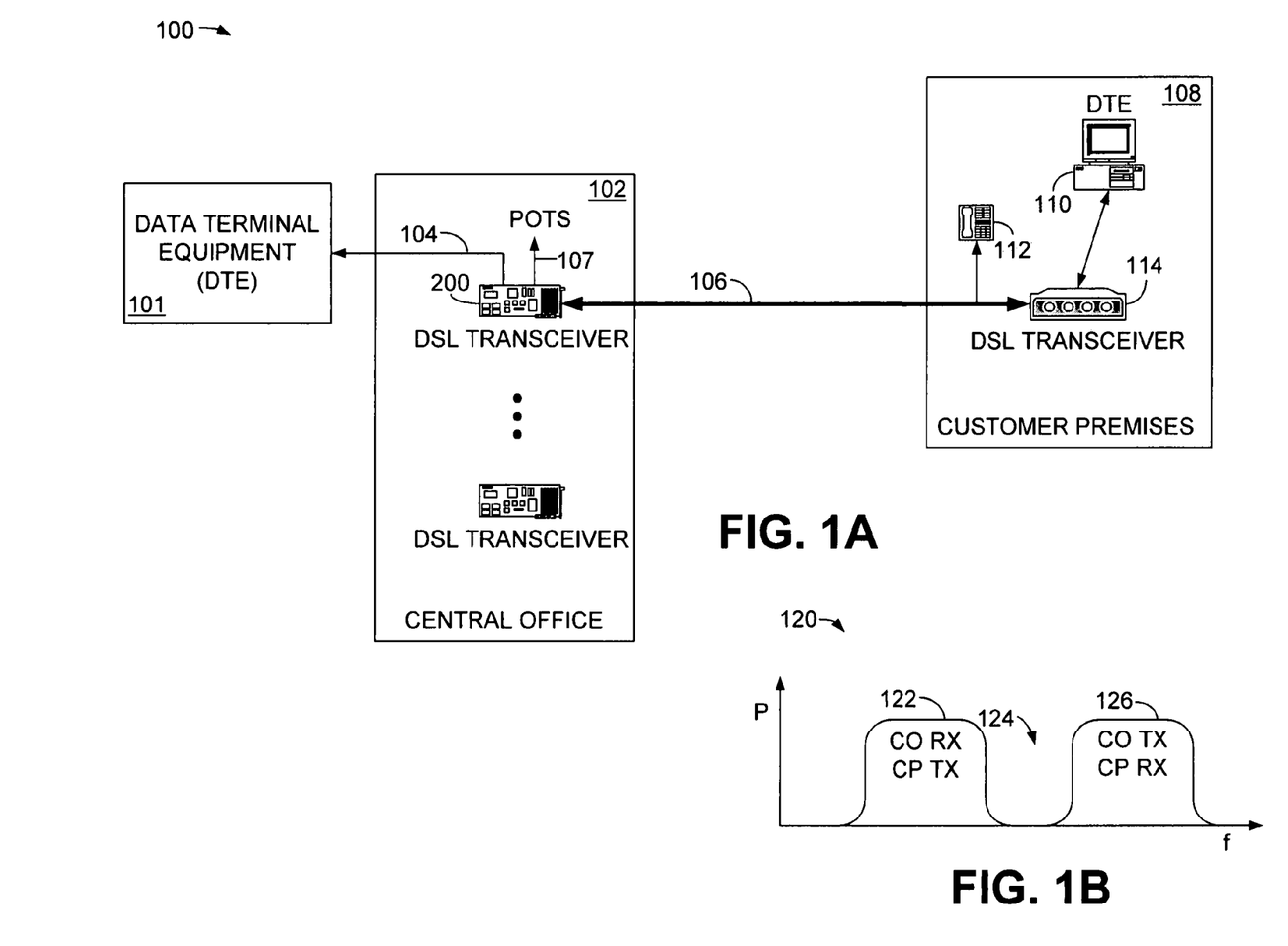
FIG. 1A is a block diagram illustrating the digital subscriber line (DSL) communication environment in which the present invention resides.
FIG. 1B is a graphical representation illustrating the frequency spectrum of the communication that occurs between the central office and the customer premises of FIG. 1A.

Turning now to the drawings, FIG. 1A is a block diagram illustrating the digital subscriber line (DSL) communication environment 100 in which the present invention resides. The DSL communication environment 100, for illustrative purposes only, is an asymmetric digital subscriber line (ADSL) communication environment. However, other DSL communication environments are contemplated by the invention. For example, the invention contemplates the use of symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL).

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 is point-to-point full duplex ADSL, using discreet multi-tone (DMT) line coding. Other communication schemes are possible between central office 102 and customer premises 108, such as variations of multi-point and half duplex.

Central office 102 includes a number of DSL transceivers, an exemplar of one of which is illustrated using reference numeral 200. DSL transceiver 200 exchanges information with data terminal equipment 101 via connection 104 and interfaces to communication channel 106 in order to communicate with DSL transceiver 114 located at customer premises 108. DTE 101 can be, for example, a computer to which the DTE 110 in customer premises 108 is communicating, or can represent access to the Internet.

DSL transceiver 114 located at customer premises 108 connects to DTE 110 and plain old telephone service (POTS) device 112 connects directly to communication channel 106. Although omitted for clarity, a POTS splitter is typically installed between the communication channel 106 and POTS device 112 to prevent the POTS device 112 from interfering with the DSL communication and to prevent DSL signals from degrading POTS performance. DTE 110 can be a personal computer and POTS device 112 can be a typical telephone. Typically, the DSL transceiver 114 is located in a home or office, and is used to allow simultaneous data communication (using DTE 110) and voice communication (using POTS device 112).

DSL transceiver 114 communicates over communication channel 106 with DSL transceiver 200 in order to exchange data information. Simultaneously with the data, voice information is transmitted over communication channel 106 and separated by DSL transceiver 200 via connection 107 and sent to typical telephone company POTS switching equipment (not shown). Data is exchanged between customer premises 108 and central office 102 in order to allow DTE 110 to access, for example, DTE 101, which may be an Internet access device provided by an internet service provider (ISP).

Although illustrated using a single customer premises 108 connected to central office 102, typically a number of customer premises locations will be connected to one central office 102 using a plurality of communication channels. Furthermore, it is also possible for a number of customer premises locations to be connected to one DSL transceiver located at a central office. However, for purposes of explanation, the invention will be described with reference to a single customer premises 108 communicating with a single DSL transceiver 200 located at central office 102. Furthermore, the invention described hereafter is embodied in both DSL transceiver 200 located at central office 102 and in DSL transceiver 114 located at customer premises 108. However, for ease of illustration, only a single DSL transceiver 200 will be described below.

FIG. 1B is a graphical representation illustrating the frequency spectrum of the communication that occurs between central office 102 and customer premises 108 of FIG. 1A. The vertical axis of graph 120 represents transmission power and the horizontal axis of graph 120 represents frequency. Generally, the communication that occurs between DSL transceiver 200 and DSL transceiver 114 is divided by frequency, with the transmission from central office 102 toward customer premises 108 (downstream) occurring at a frequency higher than the transmission of information from DSL transceiver 114 located at customer premises 108 toward the DSL transceiver 200 located at central office 102 (upstream). For example, the curve indicated using reference numeral 122 represents upstream transmission from the customer premises 108 towards the central office 102 and the curve indicated using reference numeral 126 represents downstream transmission occurring from the central office 102 towards the customer premises 108. Transmission from the customer premises 108 toward the central office 102 is generally lower in frequency in order to avoid cross-talk that may occur as the signal gets nearer to the central office 102 and an increasing number of communication channels, such as channel 106, are bundled together in common cable bundles. Furthermore, although shown as a discreet difference in frequencies indicated by region 124 in FIG. 1B it is possible that there is some overlap occurring between the curves 122 and 126. Further still, although shown as symmetric in nature for simplicity, the curves 122 and 126 may not appear identical. For example, the curve 122 might be higher in power and occur over a shorter frequency spectrum than curve 126.

Figure 2:
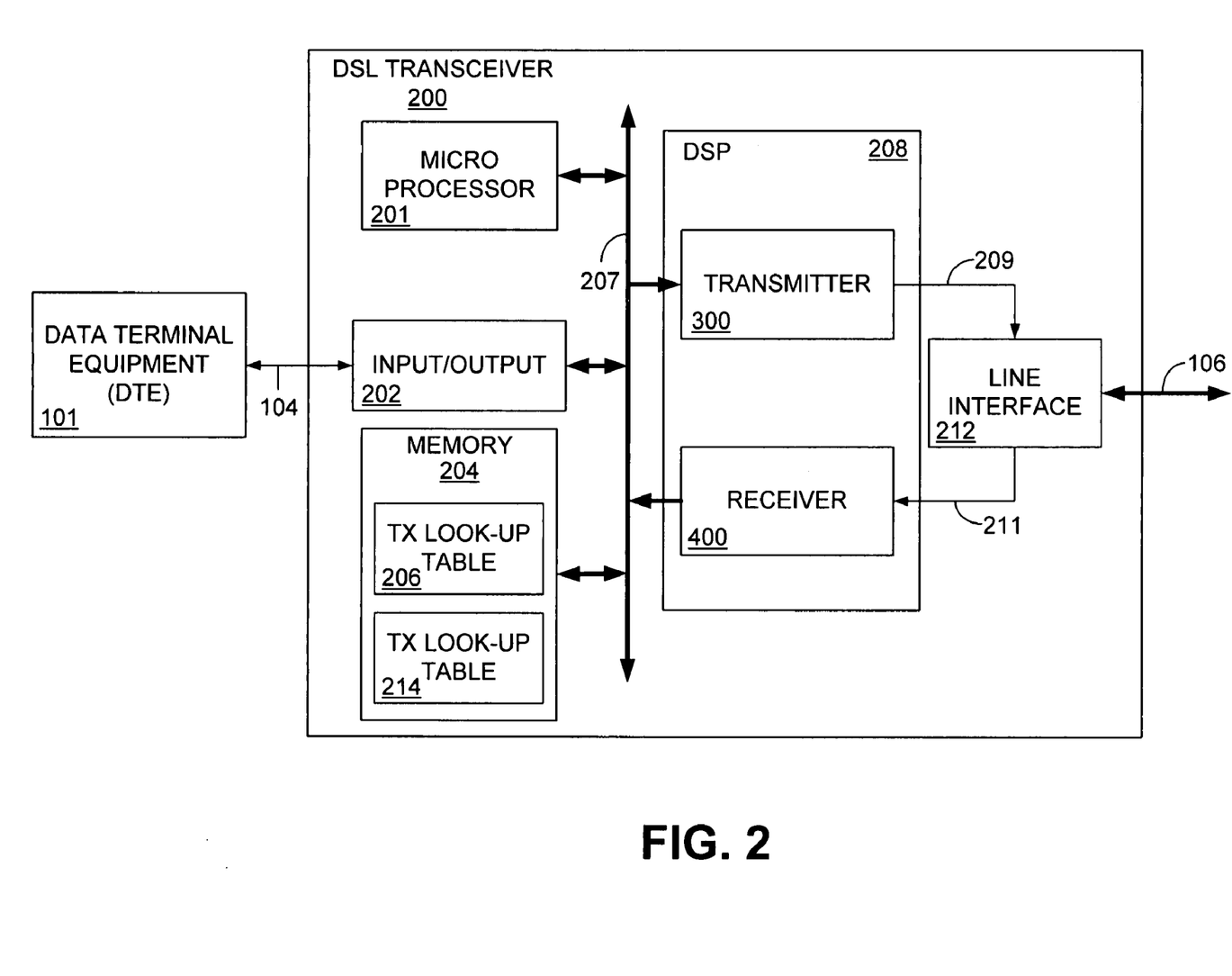
FIG. 2 is a block diagram illustrating the DSL transceiver of FIG. 1A.

FIG. 2 is a block diagram illustrating the DSL transceiver 200 of FIG. 1A. The DSL transceiver 200 communicates with DTE 101 via connection 104 where data supplied to and received from DTE 101 is exchanged via input/output element 202 within DSL transceiver 200. DSL transceiver 200 also includes microprocessor 201 and memory 204 in communication via bus 207 with digital signal processor (DSP) 208. The memory 204 and the microprocessor 201 work in cooperation to store and execute the logic of the invention. Although DSP 208 as illustrated includes the transmitter 300 and receiver 400 of the invention, the transmitter 300 and receiver 400 may be implemented separately.

Memory 204 includes transmit (TX) look-up table 206 and receive (RX) look-up table 214. Look-up tables 206 and 214 are one possible manner for providing the fractional bit rate encoding to be described below.

Transmitter 300 communicates via connection 209 with line interface 212 in order to gain access to communication channel 106. Similarly, receiver 400 receives signals from line interface 212 via connection 211. As will be described below, the transmitter 300 and receiver 400 each include the logic to enable the DSL transceiver 200 to communicate using fractional bit rates.

Figure 3:
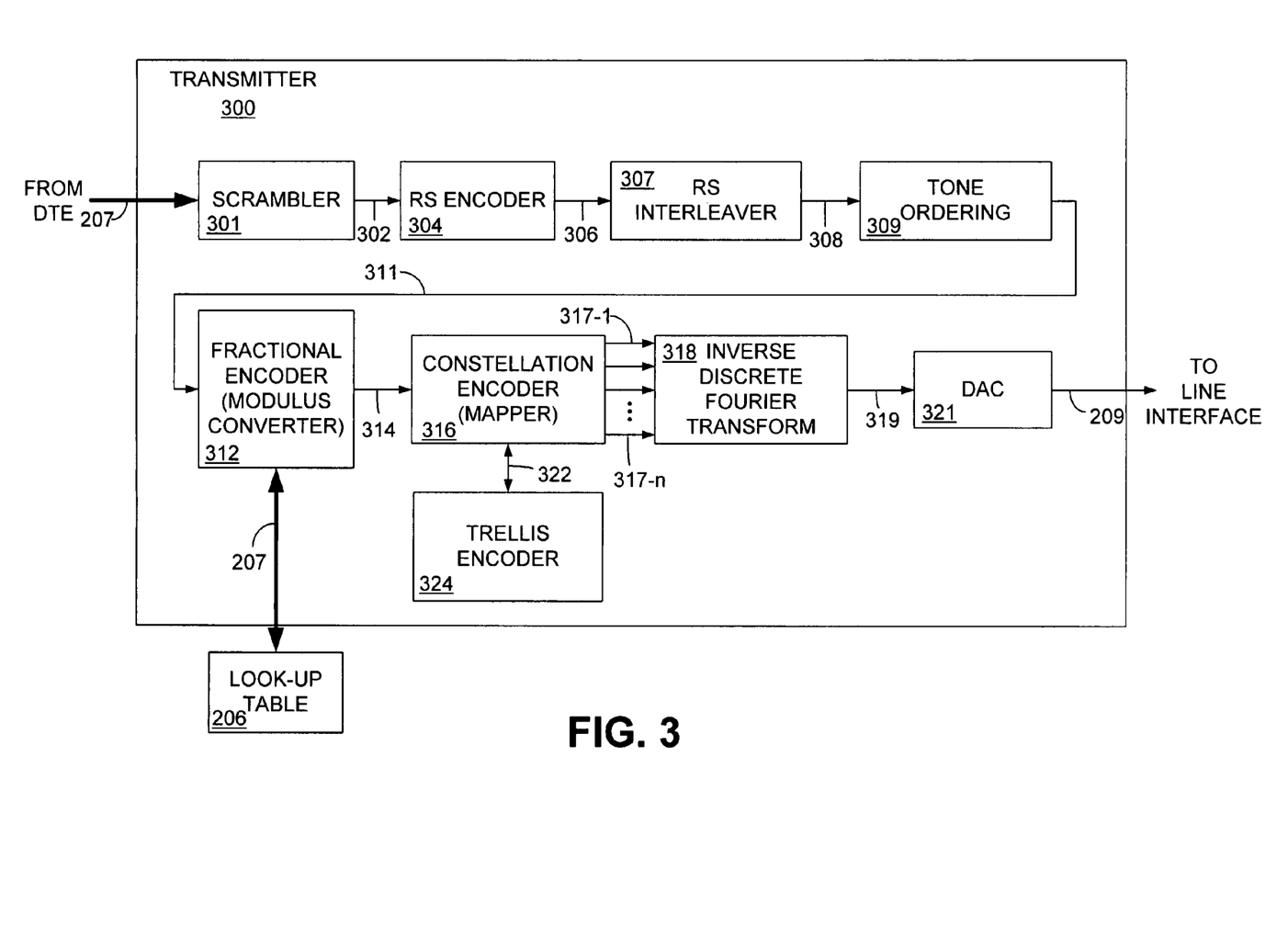
FIG. 3 is a block diagram illustrating the transmitter of FIG. 2.

FIG. 3 is a block diagram illustrating the transmitter 300 of FIG. 2. A data signal originating in DTE 101 is communicated via bus 207 to scrambler 301. The signal on connection 207 is in the form of a serial bit stream and the scrambler 301 provides a scrambled serial bit stream on connection 302. The scrambler 301 can be either a self-synchronized scrambler or a preset free running scrambler as is known in the art. Depending upon the application, the preset scrambler may have some advantages, as in the case where Reed-Solomon coding is used. The scrambler 301 provides a scrambled m bit word on connection 302 to Reed-Solomon (RS) encoder 304. The RS encoder 304 operates on the scrambled m bit word on connection 302 to provide forward error correction and provides the Reed-Solomon encoded serial bit stream including the RS encoded m bit words on connection 306. The RS encoded serial bit stream on connection 306 is operated on by RS interleaver 307 to provide an interleaved Reed-Solomon encoded serial bit stream on connection 308.

The serial bit stream on connection 308 is then supplied to tone-ordering element 309. Tone-ordering element 309 orders the groups of bits contained in the serial bit stream on connection 308 into words that are to be encoded for each signal space constellation. Essentially, the tone-ordering element 309 groups the serial bit stream into bit wise words, which will be encoded on each tone of the DMT transmission system. The output of the tone-ordering element 309 could be serial or parallel. In this embodiment, serial words are preferred. The tone-ordering element 309 precedes the fractional encoder 312, however, the order of these elements may be reversed.

The serial words on connection 311 are then sent to fractional encoder 312. Fractional encoder 312 includes the logic necessary to encode fractional bits onto each of the n tones in the DMT communication scheme. The fractional encoder 312 operates on groups of words to encode a fractional (i.e., non-integer) number of bits on each tone. The fractional encoder 312 generates n constellations for n carrier tones simultaneously, in order to add a fraction of a bit to each carrier tone. For example, for n words the resolution is 1/n th bits with the result that four binary words have ¼ bit resolution. There are several possible ways to implement the fractional encoder 312 to encode fractional bit rates. One manner is shell mapping. Shell mapping increases peak power to achieve shaping gain. While shell mapping increases peak power, the higher level signal points occur less frequently when shaping gain is employed. This is so because the transmit energy is typically concentrated in the central points of the signal space constellation. When using shell mapping (having shaping gain), with DMT, a lower overall peak factor may be achieved. Shell mapping lowers the overall peak factor of the combined signal space constellations associated with the transmitted symbol. Another manner for encoding fractional bit rates is constellation switching, which alternates between constellations of B or B+1 bits to achieve the fractional encoding. Unfortunately, constellation switching also increases the peak power due to the occasional transmission of the larger B+1 bit constellation.

Preferably, modulus conversion, as described in commonly owned U.S. Pat. No. 5,103,227, incorporated into this document by reference, is used in the fractional encoder 312. Modulus conversion achieves fractional bit rates by converting the incoming bit stream on connection 311 to symbols having an arithmetic base or modulus equal to the size of the constellation. Fractional bits are transmitted when the number of points in the constellation is not a power of 2. The modulus or constellation size for each carrier tone is computed by $M_i=2^{Bi}$ and $B_i=(SNR_i-K)/3$, where $M_i$ is the modulus, $B_i$ is the number of bits transmitted in the carrier tone, $SNR_i$ is the signal-to-noise ratio at that carrier tone frequency and K is the margin required for the decoder in the receiver. $B_i$ may be a fractional value. In conventional DMT, $B_i$ is always an integer. The modulus converter operates by switching between carrier tone frequencies. The modulus converter accepts as input all of the bits B' that are to be encoded on n carrier tones. It then performs modulus conversion, generating n index values which designate the constellation point to be transmitted on each respective carrier tone. The modulus $M_i$ of each index matches the $SNR_j$ of its respective tone. Note that $2^{B'}$ is less than or equal to the product of all $M_i$ and B' is less than or equal to the sum of all $B_i$.

To illustrate, in the case of two tones in a conventional DMT transmitter, each 3 dB of margin allows one extra bit to be transmitted on any carrier tone. In order to transmit one tone 2.5 dB higher, another tone must be transmitted 6.54 dB lower to achieve the same nominal power for the composite of both tones. This allows one additional bit to be transmitted on the first tone, but reduces the capacity of the second tone by two bits. Conventional DMT tone power trading results in the loss of one bit in channel capacity. Unfortunately, conventional DMT transmitters also tend to increase by 2.5 dB the power of the lower frequency tones and eliminate the higher frequency tones. This leads to poor PSD management in that the overall channel power is 2.5 dB high and then it drops off to zero. This results in 2.5 dB more power across much of the spectrum, which also results in 2.5 dB higher cross-talk.

In accordance with an aspect of the invention, the modulus converter allows the first tone in the above example to carry B+0.167 bits due to the presumed 0.5 dB margin and allows the second tone to carry B+2.18 bits due to the presumed 6.54 dB margin. This achieves a total of 2B+2.35 bits, which represents a gain of 0.35 bits over the "whole bit per symbol" scheme used in conventional DMT modulation.

To illustrate a second example, consider two tones with SNR sufficient to support constellations of 91 points. Then, with modulus conversion 6.5 bits ($\log_2(91)$) are transmitted on each tone yielding 13 bits. Conventional DMT cannot achieve 13 bits without violating the total average power. Conventional DMT would use constellations of 128 points on one tone and 64 points on the other tone to achieve 13=7+6 bits. This requires increasing the power of the first tone by 1.5 dB to 128/91=1.41 $V^2$ and lowering the second tone to 64/91=0.70 $V^2$ for a total power of 2.11 $V^2$, which is 0.23 dB above the allowed average power of 2.00 $V^2$ for two tones. Conventional DMT must transmit only 12 bits to avoid exceeding average power limits by 0.23 dB and generating PSD ripple of 1.5 dB. Modulus conversion provides a 0.23 dB performance advantage while adhering to any specified PSD with zero ripple.

In an alternative embodiment, the fractional encoder 312 performs the fractional bit rate encoding by communicating via connection 207 with memory 204, which contains TX look-up table 206. In a particular embodiment, TX look-up table 206 contains $2^{13}$ pairs of words that can be used to perform modulus conversion. The 13 bits form the address into the TX look-up table 206 and yields a pair of index values representing the constellation points to be transmitted on the two tones. The TX look-up table 206 can implement other desired conversions such as shell mapping. Commonly owned U.S. Pat. No. 5,251,236 to Brehmer et al. demonstrates use of a look-up table to reduce complexity of fractional rate conversion.

The fractionally encoded bit stream is supplied via connection 314 to constellation encoder 316. Constellation encoder 316 encodes each word into a constellation for one carrier tone. Preferably, each word is mapped to a multi-dimensional circular signal space constellation. Circular signal space constellations are preferable because they allow an additional 0.2 dB of shaping gain, and an approximate 1.7 dB lower peak factor. Conventional DMT transmitters, by using square signal constellations, give up 0.2 dB worth of shaping gain available through the use of circular signal space constellations. This is so due to the lower peak factor available through the use of circular signal space constellations. The advantage in channel capacity of fractional bit encoding is 0.43 dB, deriving 0.2 dB from circular constellations and 0.23 dB from modulus conversion.

A trellis encoder 324 communicates via connection 322 with constellation encoder 316. The trellis encoder 324 operates sequentially on each word supplied via connection 314. The trellis encoder encodes from one tone to the next tone. Alternatively, a single carrier trellis encoder would encode from one symbol in time to the next symbol because DMT modulation is performed using discreet carrier tones; the trellis encoder encodes from one tone to the next tone.

The constellation encoder 316 supplies n constellations on n carrier tones represented using reference numerals 317-1 through 317-n. Although shown using only four tones in FIG. 3, typically constellation encoder 316 would encode 256 individual carrier tones with the 256 encoded tones comprising an encoded symbol. The constellations represent one phase and amplitude for each tone in parallel. The constellation encoder 316 encodes each word containing the non-integer number of bits into a signal space constellation to be transmitted by the DMT transmitter. The plurality of tones, each with its respective signal space constellation, comprises a symbol that is transmitted. Each of the individual carrier tones on connections 317-1 through 317-n are supplied to inverse discrete Fourier transform (IDFT) element 318. The IDFT element 318 transforms the set of all tones (in parallel or taken together at one time) into a tone sequence of samples that are serially output on connection 319. The output on connection 319 is supplied to digital-to-analog converter (DAC) 321 for transmission via connection 209 to the line interface 212 of FIG. 2 for transmission via communication channel 106. DAC 321 may include a filter (not shown) to help control the PSD for spectrum management.

Figure 4:
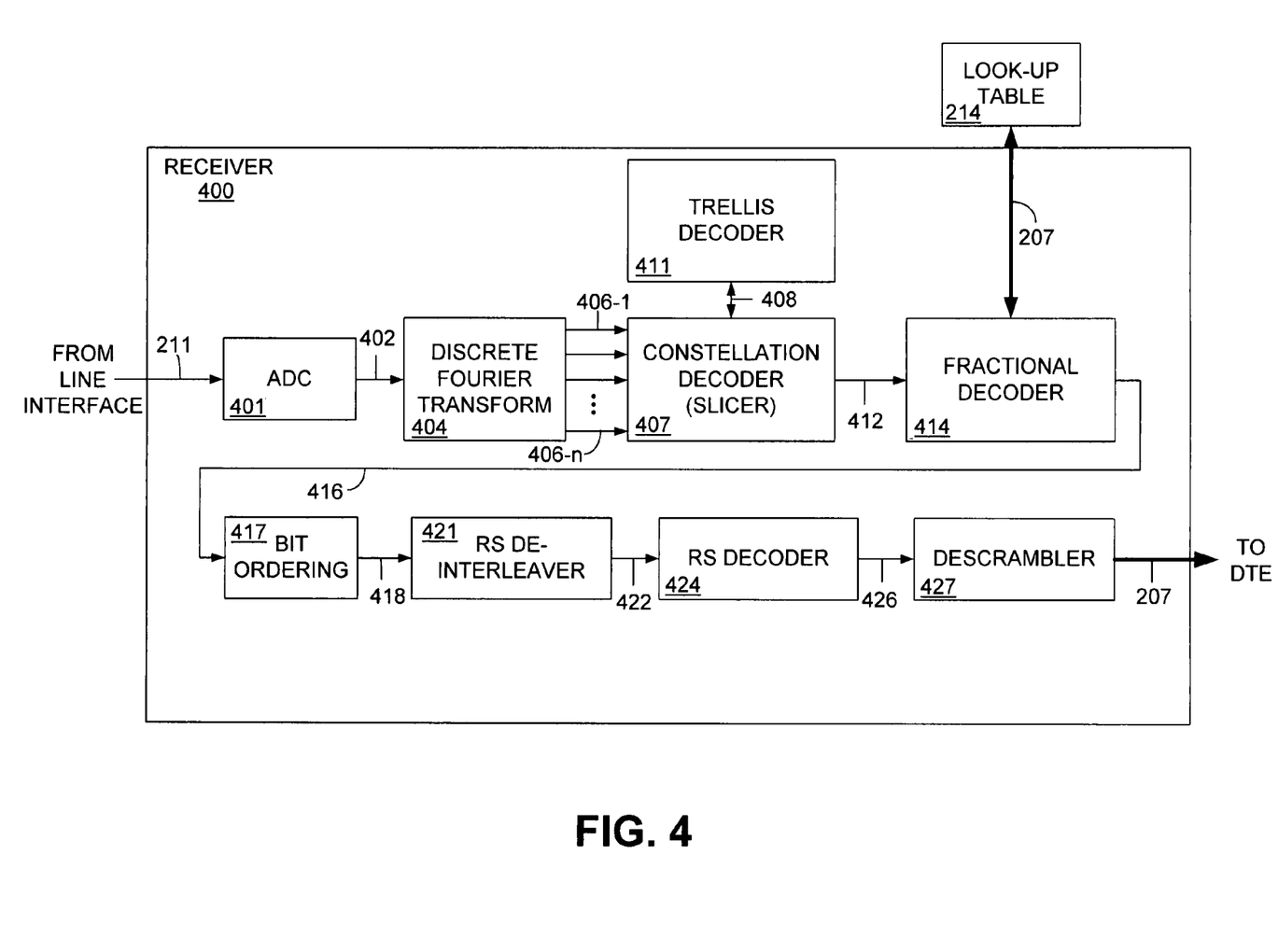
FIG. 4 is a block diagram illustrating the receiver of FIG. 2.

FIG. 4 is a block diagram illustrating the receiver 400 of FIG. 2. A signal received on communication channel 106 is supplied via line interface 212 (FIG. 2) via connection 211 to analog-to-digital converter (ADC) 401. ADC 401 may include a filter (not shown) and/or equalizer (not shown) to help control undesirable signals and intersymbol interference. ADC 401 converts the analog signal received on connection 211 into a serial bit stream on connection 402. The serial bit stream on connection 402 is supplied to discreet fourier transform (DFT) element 404. The DFT element 404 transforms the tone sequence of samples on connection 402 into a plurality of individual tones represented using reference numerals 406-1 through 406-n. DFT 404 may include adaptive phase and/or amplitude tracking for each tone. System timing may be recovered in DFT 404 by correlating phase changes on one pilot tone or across multiple tones. The tones 406-1 through 406-n correspond to the tones 317-1 through 317-n of FIG. 3. Each tone 406-1 through 406-n includes an encoded circular signal space constellation, which represents one of the fractionally encoded words.

Each of the tones 406-1 through 406-n are supplied to constellation decoder 407 which outputs an index representing the constellation point received for each of the tones. This serial group of indices is supplied via connection 412 to fractional decoder 414. The fractional decoder 414, which is preferably a modulus converter similar to that described above, converts the groups of indices, or words, into a new set of binary words, which are restored in their original order. For example, in the transmitter 300, tones 1 and 2 from tone-ordering element 309 may encode 7 and 8 bit words, respectively. These are fractionally encoded into two index values of modulus 182. The modulus is the smallest integer greater than or equal to $2^{(7+8)}/2$. The constellations have 182 points on both tones. The fractional decoder 414 converts the received 182 point constellations into two binary words of 7 and 8 bits, respectively.

RX look-up table 214 includes a 2 dimensional array of 182×182 15-bit values and can be used to convert the two received index values into the final 15 bit decoded word containing the original 7 and 8 bit words. The two index values address their respective dimension in the RX look-up table 214. RX look-up table 214 performs the inverse function of the TX look-up table 206.

Trellis decoder 411 communicates with constellation decoder 407 via connection 408. A four dimensional trellis code may add one-half bit per symbol. In such a case, tones 1 and 2, described above, may encode 7 bits each plus one trellis bit, still using a 182-point constellation.

The fractional decoder 414 supplies the serial words via connection 416 to bit ordering element 417. Bit ordering element 417 orders the bits into their original order and supplies the serial stream on connection 418 to RS de-interleaver 421, which de-interleaves the Reed-Solomon encoded bit stream. The de-interleaved bit stream is supplied on connection 422 to RS decoder 424. RS decoder 424 removes the Reed-Solomon forward error correction and supplies the scrambled bit stream via connection 426 to descrambler 427. Descrambler 427 descrambles the serial bit stream and supplies the original bit stream via connection 207 through the input/output element 202 (FIG. 2) to DTE 101.

Figure 5:
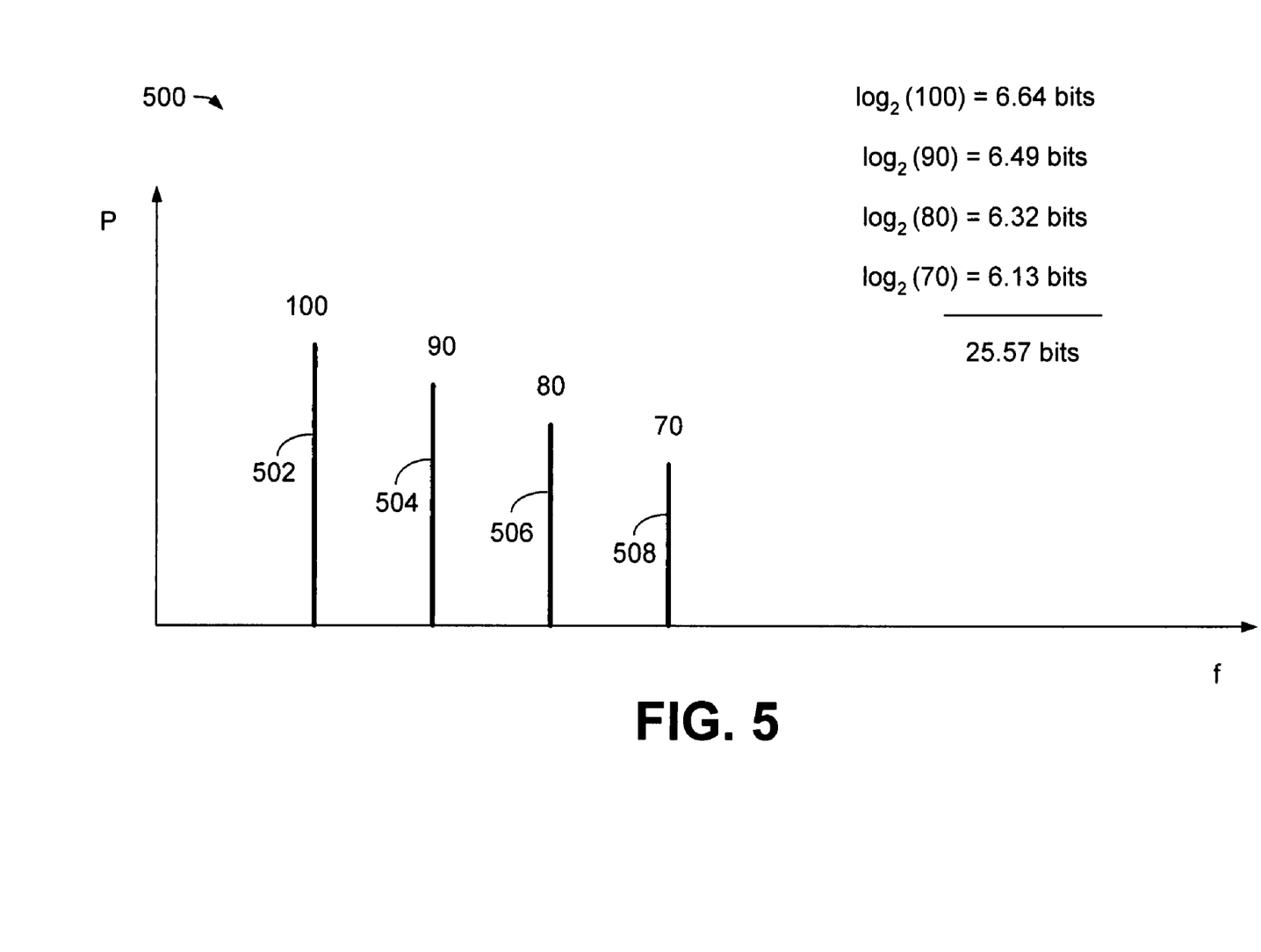
FIG. 5 is a graphical representation of a frequency spectrum illustrating the operation of the invention.

FIG. 5 is a graphical representation 500 of a frequency spectrum illustrating the operation of the invention. The vertical axis of graph 500 represents power (or signal-to-noise ratio) and the horizontal axis represents frequency. Although only four tones are used in FIG. 5, it should be understood that many more tones are typically used in a DMT communication scheme. As shown in FIG. 5, each tone represents the signal-to-noise ratio (SNR) available to that tone. The numbers above each tone representation indicate the number of available signal space constellation points that may be included in a symbol encoded at that particular tone frequency. For example, the tone represented using reference numeral 502 has sufficient SNR to transmit 100 signal points in a constellation. The tone represented by reference numeral 504, however, only includes sufficient SNR to transmit a symbol (constellation) having 90 signal points. Similarly, tone 506 includes 80 points and tone 508 includes 70 points. In a conventional DMT modulation scheme, each of the carrier tones 502, 504, 506 and 508 would be equalized to a 64-point signal constellation, resulting in each tone transmitting 6 bits. This occurs because in conventional DMT, only signal point constellations raised to powers of two are available. Alternatively, conventional DMT could boost the power of one of the tones (for example, 502) in order to transmit 128 points. Unfortunately, then other tones would need to be reduced by at least that much in order to maintain power spectral density (PSD) margins.

Consider that each of the tones 502, 504, 506 and 508 can transmit 100, 90, 80 and 70 signal points, respectively. Using $\log_2$ arithmetic it can be shown that the tone 502 can transmit 6.64 bits by taking the $\log_2$ (100). Similarly, $\log_2$ (90) equals 6.49 bits; $\log_2$ (80) equals 6.32 bits; and $\log_2$ (70) equals 6.13 bits. This arithmetic indicates that a total of 25.53 bits may be encoded using the signal-to-noise ratio available for the four carriers 502, 504, 506 and 508. Unfortunately, conventional DMT, by equalizing all the tones to transmit 64 point constellations results in each tone transmitting 6 bits (for a total of 24), thereby giving up the ability to transmit the additional 1.53 bits using the margin shown. The conventional DMT strategy to achieve 25 bit transmission on the four tones is to increase the power on tone 502 by 1.1 dB (10*log(128/100)) to allow a 128 point 7 bit constellation while lowering the power on tones 504, 506 and 508 to maintain margin for 64 point 6 bit constellations. This causes undesirable ripple in the transmitted PSD and introduces increased cross-talk into adjoining communication channels.

In accordance with an aspect of the invention, the fractional bit rate encoding for DMT uses the additional margin available in each tone to add a portion of an extra bit to each tone, thus using any additional margin in each tone to transmit an additional fraction of a bit. For the four carriers shown in FIG. 5, at least one additional bit is transmitted over the four tones. Furthermore, by using fractional bit rate encoding, a constant power level is always transmitted across all the tones. The resolution available depends upon the number of tones. For example, for n tones, 1/n resolution is available. For example, for the four tones illustrated in FIG. 5, the resolution is ¼ bit. The fractional rate encoding as described allows all of the tones to have the same amplitude or amplitudes consistent with the desired transmit spectrum and power special density requirements. Essentially, the fractional bit rate encoding scheme adjusts the density of each tone to match the available SNR of the channel and the SNR of the respective tone. By adding fractional bits per carrier (or tone) to arrive at an integer number of bits over the entire spectrum, it is possible to transmit additional bits using the same amount of power as was used to transmit the fewer number of bits and it is possible to transmit the same amount of power for each tone. This makes it possible to transmit all tones at a specified PSD with no ripple. A frame is defined as all the carrier tones that are acted on by IDFT element 318 during one transmission period. Additional carriers (or tones) increase the frame and the resolution available. For example, for 256 carrier tones, 1/256 bits can be added to each carrier tone to achieve one additional bit in a frame. Furthermore, many more than one additional bit per frame can be added based on the available SNR. The complexity of modulus conversion can be reduced by converting several groups of tones together. For example 256 tones can be converted as 32 groups of n=8 tones each, with ⅛th bit or ⅜ dB resolution.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

The invention claimed is:

1. A digital subscriber line (DSL) transceiver, comprising:
a fractional encoder, comprising a modulus converter, configured to encode a group of data bits into a plurality of words, each word encoding a non-integer number of data bits, each word associated with one of a plurality of tones;

a constellation encoder configured to encode each word into a signal space constellation, each constellation associated with one of the plurality of tones, wherein the plurality of constellations and associated tones form a symbol; and a discrete multi-tone (DMT) transmitter configured to transmit the constellation on its associated tone in the symbol, wherein the modulus converter operates by switching between the plurality of tones.

2. The transceiver of claim 1, wherein the fractional encoder further comprises a modulus converter.

3. The transceiver of claim 1, wherein the fractional encoder further comprises a shell mapper.

4. A digital subscriber line (DSL) transceiver, comprising:

a fractional encoder, comprising a shell mapper, configured to encode a group of data bits into a plurality of words, each word encoding a non-integer number of data bits, each word associated with one of a plurality of tones;

a constellation encoder configured to encode each word into a signal space constellation, each constellation associated with one of the plurality of tones, wherein the plurality of constellations and associated tones form a symbol; and a discrete multi-tone (DMT) transmitter configured to transmit the constellation on its associated tone in the symbol, wherein the shell mapper lowers an overall peak factor of a combination of the constellations in the symbol.

5. The transceiver of claim 4, wherein the DMT transmitter transmits all tones at the same power.

6. A digital subscriber line (DSL) transceiver, comprising:

a fractional encoder configured to encode a group of data bits into a plurality of words, each word encoding a non-integer number of data bits, each word associated with one of a plurality of tones;

a constellation encoder configured to encode each word into a signal space constellation, each constellation associated with one of the plurality of tones, wherein the plurality of constellations and associated tones form a symbol; and a discrete multi-tone (DMT) transmitter configured to transmit the constellation on its associated tone in the symbol, wherein the DMT transmitter is further configured to transmit all tones in the plurality at the same power and at a specified PSD with no ripple.

7. The transceiver of claim 6, wherein each constellation is a circular signal space constellation.

8. The transceiver of claim 6, wherein each constellation is a square signal space constellation.

9. The transceiver of claim 6, further comprising a trellis encoder associated with the constellation encoder.

10. A digital subscriber line (DSL) transceiver, comprising:

means for fractionally encoding each of the plurality of tones with a non-integer number of bits, wherein the total number of bits over the plurality of tones is an integer;

means for constellation encoding each tone with a modulation symbol; and means for modulating each tone, wherein the encoding means includes shell mapping means and the shell mapping means lowers an overall peak factor of a combination of signal space constellations associated with the symbol.

11. The transceiver of claim 10, further comprising means for encoding each of the plurality of tones with a modulation symbol.

12. The transceiver of claim 10, wherein the encoding means includes modulus conversion means.

13. The transceiver of claim 10, wherein the encoding means includes shell mapping means.

14. The transceiver of claim 10, wherein the encoding means includes constellation switching means.

15. The transceiver of claim 10, wherein the modulation symbol is encoded into a circular signal space constellation.

16. The transceiver of claim 10, further comprising means for trellis encoding each of the plurality of tones.

17. The transceiver of claim 10, wherein each of the plurality of tones has a signal to noise ratio (SNR) and the non-integer number of bits is selected to match the SNR of each tone.

18. The transceiver of claim 10, wherein the means for modulating transmits all tones at the same power.

19. A method for encoding fractional bit rates using discrete multi-tone (DMT) modulation, the method comprising the steps of:

fractionally encoding a group of words to produce a group of constellation signal points, each signal point selected from a plurality of constellations, each constellation associated with one of a plurality of tones, where a size M, M is an integer and >1 of each of the constellations is selected to match an SNR of the associated tone; and modulating each signal point with the associated tone.

20. The method of claim 19, where $\log_2(M)$ is not restricted to an integer value.

21. The method of claim 19, wherein the step of encoding a group of words comprises modulus conversion.

22. The method of claim 19, wherein the step of encoding a group of words comprises shell mapping.

23. The method of claim 19, wherein the step of encoding a group of words comprises constellation switching.

24. The method of claim 19, wherein at least one of the constellations is a circular signal space constellation.

25. The method of claim 19, wherein at least one of the constellations is a square signal space constellation.

26. The method of claim 19, further comprising the step of trellis encoding each of the plurality of tones.

27. The method of claim 19, wherein each of the plurality of tones has a signal to noise ratio (SNR) and the plurality of SNR's comprise a SNR of a communication channel and the non-integer number of bits is selected to match the SNR of the communication channel in the vicinity of each tone.

28. The method of claim 19, wherein the modulating step transmits tones at the same power.

29. The method of claim 19, further comprising the step of transmitting all tones at a specified PSD with no ripple.

* * * * *